United States Patent
Dickinson et al.

[19]

[11] Patent Number: 6,049,620
[45] Date of Patent: Apr. 11, 2000

[54] CAPACITIVE FINGERPRINT SENSOR WITH ADJUSTABLE GAIN

[75] Inventors: Alexander G. Dickinson, Vero Beach, Fla.; Ross McPherson, Denville, N.J.; Sunetra Mendis, Palo Alto, Calif.; Paul C. Ross, Morris Plains, N.J.

[73] Assignee: Veridicom, Inc., Santa Clara, Calif.

[21] Appl. No.: 08/855,230

[22] Filed: May 13, 1997

(Under 37 CFR 1.47)

Related U.S. Application Data

[63] Continuation-in-part of application No. 08/573,100, Dec. 15, 1995.

[51] Int. Cl.[7] .............................. G06K 9/28; G06K 9/36
[52] U.S. Cl. ............................................ 382/124; 382/108
[58] Field of Search ........................... 382/115, 124–127, 382/312, 108; 340/825.34; 320/166; 257/261, 291–293, 296, 298, 300, 314, 71, 72; 358/446, 461, 406

[56] References Cited

U.S. PATENT DOCUMENTS

| | | | |
|---|---|---|---|
| 3,781,855 | 12/1973 | Killen | 340/146.3 E |
| 4,290,052 | 9/1981 | Eichelberger et al. | 340/365 C |
| 4,329,717 | 5/1982 | Logie et al. | 358/282 |
| 4,353,056 | 10/1982 | Tsiko | 340/146.3 E |
| 4,991,127 | 2/1991 | Crookshanks | 364/571.04 |
| 5,144,680 | 9/1992 | Kobayashi et al. | 382/4 |
| 5,325,442 | 6/1994 | Knapp | 382/4 |
| 5,495,077 | 2/1996 | Miller et al. | 178/18 |
| 5,586,042 | 12/1996 | Pisau et al. | 364/482 |
| 5,778,089 | 7/1998 | Borza | 382/124 |
| 5,818,973 | 10/1998 | Hsu | 382/260 |
| 5,838,463 | 11/1998 | Gahang | 358/465 |
| 5,841,126 | 11/1998 | Fossum et al. | 250/208.1 |
| 5,844,265 | 12/1998 | Mead et al. | 257/291 |
| 5,852,670 | 12/1998 | Setlak et al. | 382/126 |

OTHER PUBLICATIONS

David A. Bell, Solid State Pulse Circuits, Reston Publishing Company, Inc., ISBN 0–8359–7057–4, pp. 36–38, 1981.

S. Anderson et al., A Single Chip Sensor & Image Processor for Fingerprint Verification, IEEE Custom Integrated Circuits Conference, pp. 12.1.1–12.1.4, 1991.

*Primary Examiner*—Leo H. Boudreau
*Assistant Examiner*—Brian P. Werner
*Attorney, Agent, or Firm*—Skjerven, Morrill, MacPherson, Franklin & Friel LLP

[57] ABSTRACT

The present invention relates to a fingerprint sensing device comprising a planar array of closely-spaced capacitive sense elements. When a finger is placed in close proximity to the sensing device, the capacitive sense elements measure a capacitance between the finger and a single capacitor plate in each sense element. This is accomplished by precharging each capacitor plate, and then using a known current source to remove a fixed amount of charge from each capacitor plate. The measured capacitance varies as a function of the distance between the capacitor plate and the finger surface. Thus, a capacitance measurement allows the distance between the capacitor plate and the finger surface to be determined. Distance measurements across the array of sense elements are combined to produce a representation of the pattern of ridges on the finger surface which comprise a fingerprint. After a fingerprint is acquired, the quality of the fingerprint is evaluated, and if necessary, a gain parameter for the sense elements is iteratively adjusted until a satisfactory fingerprint is acquired.

14 Claims, 8 Drawing Sheets

CAPACITIVE FINGERPRINT SENSOR WITH ADJUSTABLE GAIN

RELATED APPLICATIONS

This application is a continuation-in-part of a pending U.S. patent application, entitled "Capacitive Fingerprint Acquisition Sensor," by inventors Alexander G. Dickinson, Ross McPherson, Sunetra Mendis and Paul C. Ross, having Ser. No. 08/573,100, and a filing date of Dec. 15, 1995. This application hereby incorporates by reference the above-referenced patent application.

BACKGROUND

1. Field of the Invention

The present invention relates to a method and an apparatus for electronically sensing a fingerprint on a finger surface, and more particularly to a capacitive fingerprint sensor with an adjustable gain.

2. Related Art

Accurate and cost effective verification of personal identity is becoming increasingly important. Verification of personal identity can be used to prevent calling card and credit card fraud, deter theft and misuse of portable products, such as cellular phones and laptop computers, and ensure security in electronic commerce. Many methods have been proposed for electronic identification of individuals including: passwords, hardware tokens such as credit cards and ATM cards, and even portable encryption devices that combine the ideas of password and token. All of these have the problem that it is difficult or impossible to ensure that the token is in the possession of its rightful owner.

Biometric techniques rely on verifying identity by identifying a unique feature of the individual's body, such as voice, fingerprint, hand print, signature, and retina pattern. These techniques have the advantage that they move with the individual and are theoretically capable of great accuracy. However, they suffer from the drawback that in many cases, acquiring the data requires complex equipment and complex interactions with the user. Comparison of the acquired biometric data with a database of biometric data can also be quite computationally intensive, and can consequently require tremendous computational resources. Furthermore, biometric techniques such as signatures and voice recognition are subject to relatively high error rates.

Of all presently-used biometric identification techniques, fingerprints are perhaps the most appealing. Fingerprints have been accepted for 75 years as a legal means for verifying identity "beyond all reasonable doubt," and acquiring a fingerprint requires little specific behavior by the user. Considerable research has gone into the task of extracting fingerprint features and performing database comparisons. Existing technology allows the relevant features of a fingerprint to be represented in as little as 10 bytes of data, with recognition in less than 1 second, and with false acceptance and false rejection rates of 0.01%. Furthermore, the computer hardware required for recording and comparing fingerprint data can be centralized and accessed through a telecommunications network thereby allowing costs to be amortized across many transactions.

The main barrier to the widespread use of fingerprint recognition is fingerprint acquisition. There must be an acquisition device at every identification site. Existing techniques for fingerprint acquisition rely on optically imaging the fingerprint onto a light sensitive detector such as a CCD(Charged Coupled Device), to obtain an electronic image of the fingerprint. This approach has a number of problems such as high cost, great complexity, large size, poor image quality, and susceptibility of the optical system to misalignment and breakage. Optical devices are also susceptible to "spoofing," wherein a simulacrum of the fingerprint or even a photocopy of a fingerprint image is used to fool the optical sensor.

Another method for sensing fingerprints is by using a capacitive sensor, such as the sensor disclosed in U.S. Pat. No. 5,325,442, entitled, "Fingerprint Sensing Device and Recognition System Having Predetermined Electrode Activation," by inventor Alan G. Knapp (the "Knapp patent"). The Knapp patent discloses a fingerprint sensing device comprising a planar array of closely-space capacitive sense elements. When a finger is placed in close proximity to the sensing device, the capacitive sense elements measure a capacitance between the finger surface and single capacitor plate in each sense element. This is accomplished by sensing a drive current while driving a voltage onto the capacitor plate. The measured capacitance varies as a function of the distance between the capacitor plate and the finger surface. Thus, a capacitance measurement allows the distance between the capacitor plate and the finger surface to be determined. Distance measurements across the array of sense elements are combined to produce a representation of the pattern of ridges on the finger surface which comprise a fingerprint.

There are however a number of serious flaws with the design disclosed in the Knapp patent. (1) The Knapp invention operates by driving a charging current onto a column line which feeds into a sense electrode and measuring a charging current to determine a capacitance between the sense electrode and the finger surface. In such a configuration, because of the length of the column line and the small size of the capacitance being measured, discriminating between the charging of the column line and the charging of the electrode plate is a difficult if not impossible task. (2) No provision is made in the design for variations in capacitance due to, for example, dry finger surfaces and temperature variations. (3) Additionally, the invention disclosed in the Knapp patent measures a charging current. This charging current is likely to vary widely over time as the electrode plate and the attached column line are charged. Hence, it is unlikely that a charge current measured at a particular instant in time will be an accurate indicator of capacitance.

What is needed is a capacitive fingerprint sensor with sufficient sensitivity to gather a fingerprint from a finger surface, and with sufficient adjustability to deal with variations in capacitance due to changes in moisture and temperature characteristics of the finger surface.

SUMMARY

The present invention provides a method and an apparatus for detecting a fingerprint from a finger surface. The apparatus includes a planar array of capacitive sense elements disposed on a substrate. It also includes an insulating and receiving surface disposed over the array of sense elements, which is adapted to receive a finger so that a sense element and a portion of the finger surface located thereabove create a measurable change in capacitance. The capacitance is measured by first precharging each sense element, and then using a known current source to remove a fixed amount of charge from each capacitor plate. After a fingerprint is acquired, the quality of the fingerprint is evaluated, and if necessary, a gain parameter for the sense elements is iteratively adjusted until a satisfactory fingerprint is acquired.

Thus, the present invention can be characterized as a method for detecting a fingerprint from a finger surface using an array of sense elements containing electrode plates. The method comprises the steps of: placing the finger surface over the array of sense elements, so that the electrode plates within the sense elements form one plate of the capacitor, the other plate being the finger surface; charging the electrode plates to a reference voltage; draining charge off the electrode plates at a determinable rate; and measuring voltages from respective electrode plates after a determinable time interval has elapsed; and finally forming the voltages into a representation of the fingerprint from the finger surface.

According to an aspect of the present invention, the method includes the step of converting voltages into a digital form to create a digital representation of the fingerprint.

One embodiment of the present invention may also be characterized as a method for detecting a fingerprint from a finger surface, the method using at least one sense element, the method comprising the steps of: placing the finger surface over at least one sense element; measuring electrical signals from the at least one sense element, the electrical signals indicative of an interaction between the at least one sense element and the finger surface; forming the electrical signals into a representation of the fingerprint from the finger surface; evaluating the quality of the representation of the fingerprint; if the representation is of poor quality, adjusting measurement parameters of the at least one sense element, and measuring the electrical signals again to form another representation of the fingerprint. According to one aspect of this embodiment, the step of measuring electrical signals from the at least one sense element measures a capacitance between the at least one sense element and the finger surface. According to another aspect of this embodiment, the step of measuring electrical signals measures a resistance between the at least one sense element and the finger surface. According to yet another aspect of this embodiment, the step of measuring electrical signals gathers a signal from an optical scan of the finger surface. According to another aspect of this embodiment, the step of adjusting measurement parameters includes adjusting a gain of the at least one sense element.

The present invention may also be characterized as an apparatus for detecting a fingerprint on a finger surface, comprising: an array of sense elements, sense elements in the array including, an electrode plate which forms a capacitor with the finger surface, and an amplifier, which amplifies the voltage on the electrode plate; an insulating and receiving surface disposed over the array of sense elements; driving circuitry coupled to sense elements in the array of sense elements for driving a voltage onto electrode plates in the sense elements; and sensing circuitry coupled to the sense elements for sensing a voltage on the electrode plates in the sense elements.

According to an aspect of the present invention, sense elements include a current source which drains current form the electrode plates at a predetermined rate.

According to another aspect of the present invention, the apparatus includes at least one voltage measurement circuit for measuring voltage on an electrode plate in a sense element in the array of sense elements.

According to another aspect of the present invention, the sensing circuitry includes a plurality of lines extending through the array of sense elements, the plurality of lines carrying voltage signals from sense elements to voltage measuring circuitry on the periphery of the array, so that the lines traverse at most half of the array before arriving at the periphery of the array.

According to another aspect of the present invention, the driving circuitry includes: a plurality of lines extending through the array of sense elements, the plurality of lines delivering driving current to the sense elements; and a plurality of drivers on the periphery of the array coupled to the plurality of lines, for supplying the drive current to the sense elements, such that a pair of drivers are attached to opposite ends of lines in the plurality of lines.

According to another aspect of the present invention, the apparatus includes an addressing mechanism for selectively accessing at least one sense element from the array of sense elements.

According to yet another aspect of the present invention, the array of sense elements is located in a module, the module including: at least one analog-to-digital converter coupled to the sensing circuitry; a digital signal processor coupled to the at least one analog-to-digital convertor, for performing computations on a representation of the fingerprint gathered from the array; and an interface circuit for communicating with devices outside of the module.

According to another aspect of the present invention, sense elements in the array include: a drive input, including a drive switch to selectively switch driving current onto the electrode plate; and a sense output, including a sense switch to selectively switch voltage from the electrode plate to the sense output.

According to another aspect of the invention, sense elements in the array of sense elements include a current source, which drains current from the electrode plate at a predetermined rate.

Because the new capacitive sensor reported here is manufactured using a standard semiconductor fabrication process, it is cheaper, smaller, and more robust than optical systems. The metal capacitor plates are fabricated from metal layers on the integrated circuit. The control circuits, required for capacitance measurement and readout, are also fabricated on the same integrated circuit. No special techniques are required. Although this method requires silicon area as big as the fingerprint, the sensor elements can be made quite large to achieve the desired resolution and, speed is not a crucial issue. Hence, a relatively old and inexpensive CMOS processes (such as 1.2 micron or 2 micron) can be used. Furthermore, usable images can be acquired even if there are dead sensor elements. Both these factors will increase yield.

The capacitive sensing method also produces higher quality images than optical techniques because it can detect intermediate levels between the ridges and valleys of the fingerprint. Furthermore, because the scheme relies on the fact that the finger forms a plate of the capacitor, the finger must be able to conduct electricity. This eliminates the possibility of "spoofing" the device with a plastic simulacrum or a photocopy. Even though a conducting simulacrum might be created, typically it would not produce an image sufficiently like the original to generate a false acceptance.

In one embodiment of the present invention, images from the sensors contain gray level information. In another embodiment, binary images of the fingerprint are gathered and the sensor includes thresholding circuitry incorporated into the readout circuit to generate a binary output from the sense elements. The threshold is set locally in specific regions of a chip to correct for variations across the chip.

DESCRIPTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein.

Figure 1:
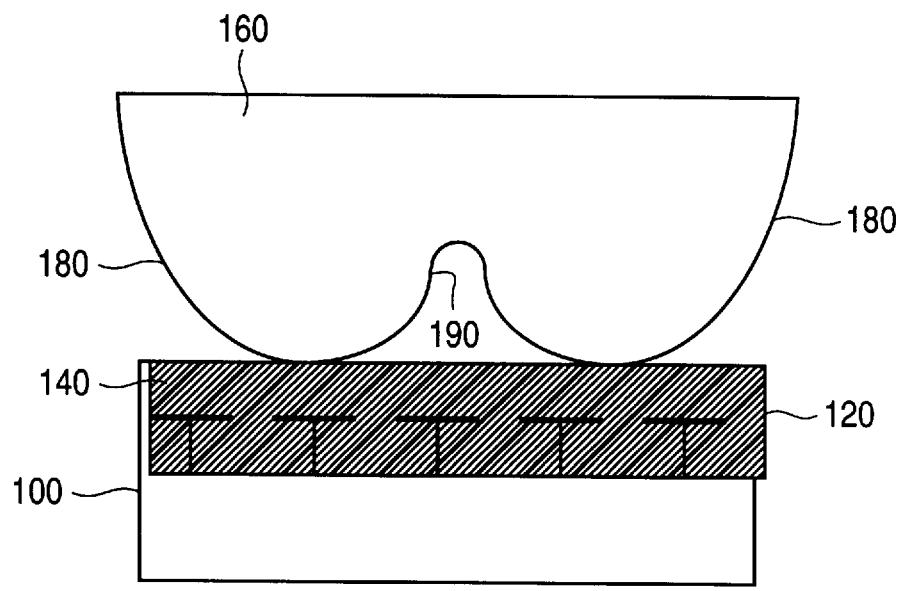
FIG. 1 provides a cross-sectional view of an array of sense elements located below two fingerprint ridges of a finger surface in accordance with an aspect of the present invention.

FIG. 1 shows a topological sensor 100 that contains an array of sense elements 120 (also referred to as electrodes or capacitor plates). The individual sense elements 120 typically have dimensions smaller than the item under investigation. When used as a fingerprint sensor, the sense elements have dimensions that are smaller than the ridges and valleys of a finger. While the present invention will be described in terms of a fingerprint sensor, one of ordinary skill in the art will recognize that the invention is more generally applicable to the detection of topological variations in objects other than fingerprints. In such cases, the dimensions of the sense elements should be chosen as appropriate for the selected object or objects. Disposed above the sense elements is a suitable insulating material, such as glass or plastic, which serves as a sensing surface 140.

FIG. 1 also shows a finger surface 160 which is placed in close proximity to sensing surface 140. Because finger surface 160 is uneven, certain portions of the finger surface 160 (ridges 180) will be in close proximity to the sensing surface 140, while other portions (valleys 190) will be farther from sensing surface 140. Each sense element 120 forms a capacitor with the portion of finger surface 160 located directly thereabove. Sense elements 120 form one set of capacitor plates with the other plate comprising finger surface 160.

The capacitance of a capacitor is determined by the equation:

$$C = k(A/d)$$

where C is capacitance, k is the dielectric constant, A is the surface area of the capacitor and d is distance between electrodes.

As can be seen from the preceding equation, the capacitance of a capacitor is proportional to the distance between the electrodes. Consequently, the capacitance of the array of capacitors formed between the sense elements and finger surface 160 will vary with finger topography. Specifically, the capacitance of a capacitor formed between a sense element 120 and valley 190 of finger surface 160 will be less than the capacitance of a capacitor formed between a sense element 120 and ridge 180 of finger surface 160. Capacitors formed between the sense elements 120 and regions of the finger intermediate to the ridges and valleys will have capacitances between the limits defined by the ridges and valleys.

The capacitances of the array of capacitors are subsequently transformed into a signal representing, for example, an image to form a visual representation of this topography.

The capacitive fingerprint sensor of the present invention includes an array of small metal plates placed at a pitch determined by the resolution required of the image. The metal plates are covered by an insulting material such as a layer of plastic or glass which is typically a few microns thick. The metal plates have some parasitic capacitance to the grounded substrate $C_m$. When a finger at a known potential, such as ground, is brought in close proximity to sensing surface 140, the capacitance on sense elements 120 changes. The surface of the finger is uneven, with "ridges" and "valleys", typically a few hundred microns apart, forming the "print" of the finger. The ridges of the print will be closer to sensing surface 140, and the valleys will be further away, typically by about 100 microns. Since the capacitance ($C_f$) between a metal plate and finger surface 160 depends on the distance and the material between the two, it will vary with the finger topography.

$C_f$ is the series combination of the capacitance between the metal plate and the top of the insulator ($C_{fi}$) and the capacitance between the top of the insulator the finger ($C_{fa}$). These capacitances can be expressed as, $$C_{fa} = \frac{\varepsilon_a A}{d_a}$$

$$C_{fi} = \frac{\varepsilon_i A}{d_i} \quad (1)$$

where $\varepsilon_i$ and $\varepsilon_a$ respectively the dielectric constants of the insulator and air, respectively, $d_i$ is the thickness of the insulator, $d_a$ is the distance from the insulator to finger surface 160, and A is the area of sense element 120. The expression for $C_f$ is therefore $$C_f = C_{fi} \| C_{fa} = \frac{\varepsilon_i \varepsilon_a A}{d_i \varepsilon_a + d_a \varepsilon_i} \quad (2)$$

The equivalent capacitance on a metal plate can be expressed as $$C_{eq} = C_m + C_f \quad (3)$$

where $C_m$ is the parasitic capacitance.

It is possible then to obtain an image of the fingerprint by measuring capacitances across the array because capacitors formed by a plate-ridge pair will have a much greater capacitance than those formed by a plate-valley pair. Capacitances between these limits will be created in areas of the finger that lie between a ridge and valley.

Operation

The present invention measures capacitance by using a known current source to remove a fixed amount of charge $\Delta q$ from each capacitor and measuring the resulting voltage difference $\Delta V$. The total capacitance of each plate can be calculated as $$C_{eq} = \frac{\Delta q}{\Delta V} = \frac{I_o \Delta t}{\Delta V} \quad (4)$$

where $I_o$ is the known current and $\Delta t$ is the time interval required to drain an amount of charge equal to $\Delta q$. Combining equations 2–4, the relationship between $d_a$ and $\Delta V$ can be expressed as, $$\frac{I_o \Delta t}{\Delta V} = C_m + \frac{\varepsilon_i \varepsilon_a A}{d_i \varepsilon_a + d_a \varepsilon_i}$$

When the distance from finger surface 160 to sensing surface 140 is much larger than the insulator thickness, $(d_a >> d_i)$, $C_{fa}$ becomes much smaller than $C_{fi}$, and the above expression simplifies to $$\frac{I_o \Delta t}{\Delta V} = C_m + \frac{\varepsilon_a A}{d_a}$$

These expressions, along with the insulator parameters and the parasitic capacitance of the metal plate can be used to estimate the distance between the insulator and the finger, and thereby obtain a map of the fingerprint. Note that mapping the voltage variation across the array of capacitors without converting to distances provides a relative measurement of the capacitance variation and is sufficient to create an image.

Figure 2:
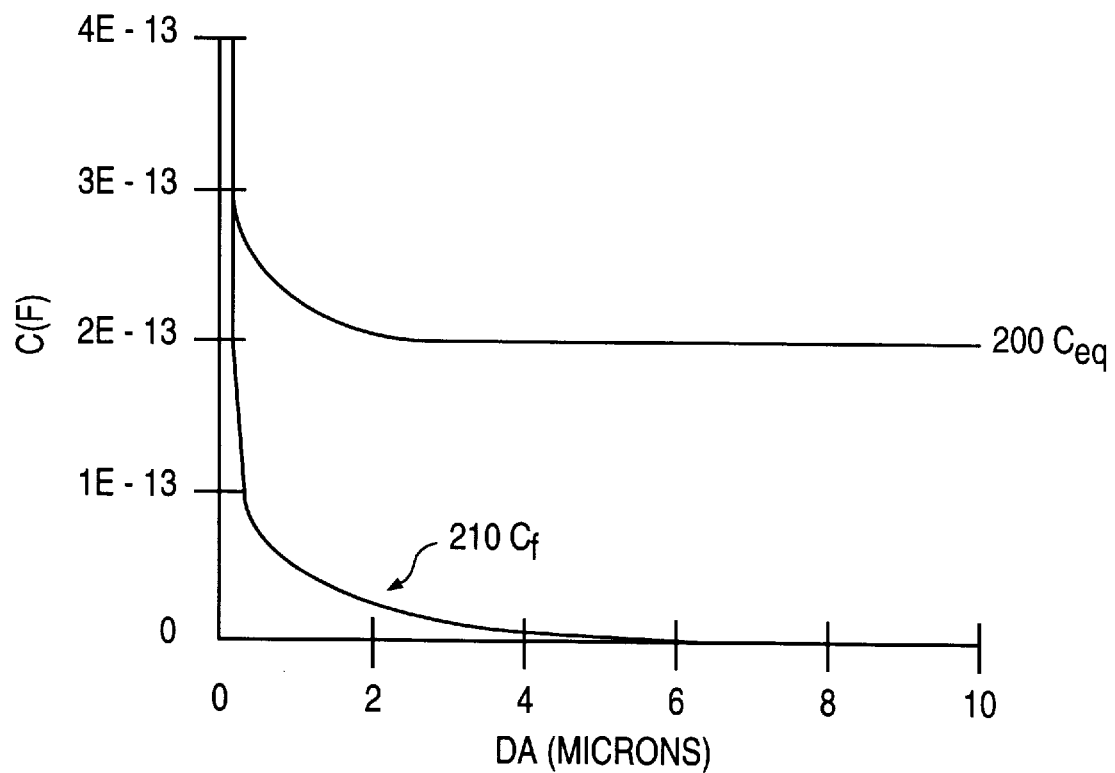
FIG. 2 is a graph illustrating how capacitance varies as a function of the distance between a sense electrode and the finger surface in accordance with an aspect of the present invention.

FIG. 2 is a graph illustrating capacitance as a function of the distance between the sense element 120 and the finger surface 160 in accordance with an aspect of the present invention. The upper line $C_{eq}$ 200 is the equivalent capacitance of a sense electrode which includes $C_m + C_f$. The lower line $C_f$ 210 represents the capacitance between the metal plate and the top of the insulator $C_{fi}$ and the capacitance between the top of the insulator and the finger surface $C_{fa}$. As can be seen from FIG. 2, capacitance falls off sharply as the distance between finger surface 160 and the capacitor of plate 120 increases.

Figure 3:
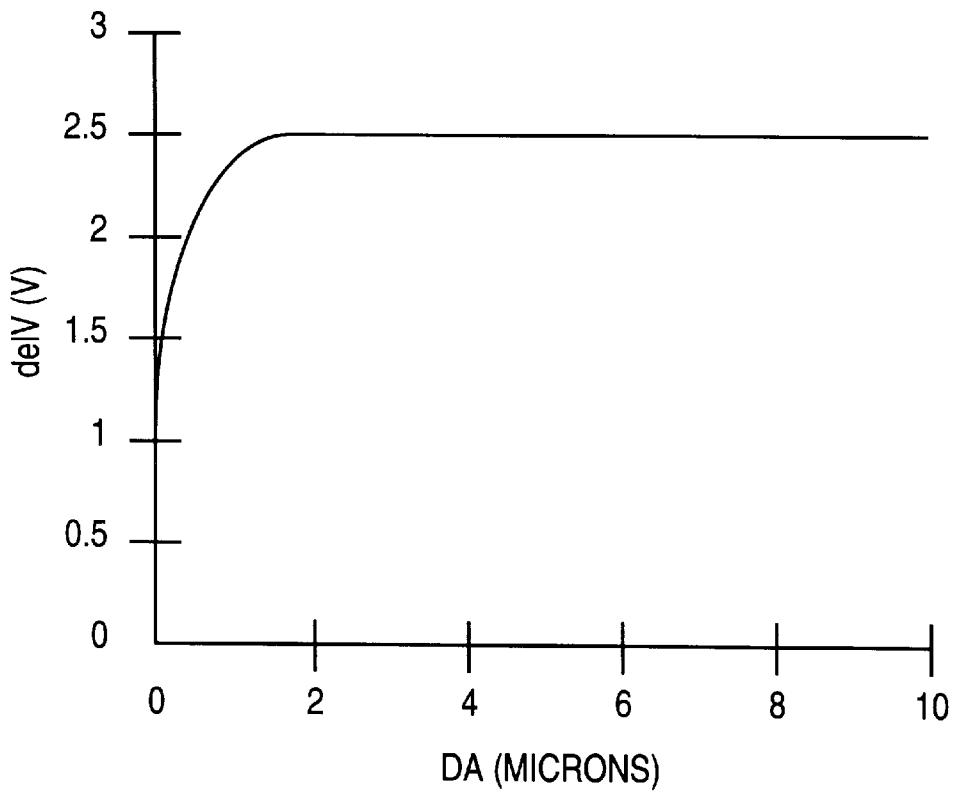
FIG. 3 is a graph illustrating the change in output voltage as a function of distance between a sense electrode and a finger surface in accordance with an aspect of the present invention.

FIG. 3 is a graph illustrating how the voltage on a sense element 120 changes as a function of distance $d_a$ between finger surface 160 and the sensing surface 140 when a fixed amount of charge is removed from capacitor plate 120 in accordance with an aspect of the present invention. The shape of this graph is consistent with experimental results which show sharp edges between black and white regions of the image. Although it is theoretically possible to use this curve to calculate any value of $d_a$, in practice it is not possible to measure the voltage difference with sufficient accuracy to calculate values of $d_a$ larger than a few microns.

Figure 4:
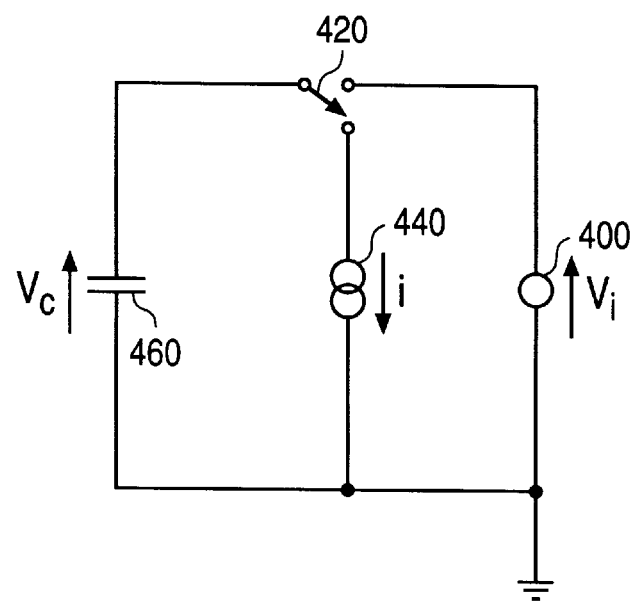
FIG. 4 is a high-level circuit diagram of a circuit used to measure capacitance from a capacitive sense element in accordance with an aspect of the present invention.

FIG. 4 is a high-level circuit diagram of a circuit used to measure capacitance from a capacitive sense element in accordance with an aspect of the present invention. In operation, finger surface 160 is placed near sensing surface 140, and the capacitor plates 120 are brought to a known potential $V_i$ by connecting the array of sense elements to a voltage source 400 via switch 420. A given capacitor 460 having capacitance C now contains a charge $q_i = CV_i$. With finger surface 160 remaining in place near sensing surface 140, the array of sense elements are disconnected from the voltage source 400 and connected to a current source 440 via switch 420. The connection between the sense elements 120 and the current source 440 is maintained for a fixed period of time t. The amount of charge drained from a given capacitor is $q_k = i_t$, where i is the current generated by the current source 440. At the end of time period t, the potential of the sense element 120 is measured to obtain a value $V_f$. The capacitance of the given capacitor 460 can now be calculated from the relationship q=CV, where q is the charge $q_k$ drained from the capacitor, and V is the difference between the initial potential $V_i$ and final potential $V_f$ of capacitor plate 120. The capacitance of the capacitor 460 is thus given by the expression $$C = q_k / (V_i - V_f)$$

By measuring a capacitance of a capacitor in a sense element 120 it is possible to calculate a distance d between a sense element 120 and the portion of the finger surface 160 located thereabove.

Of course, the sense elements each has a parasitic capacitance with respect to other elements in the device. To detect the presence of a ridge, for example, the change in capacitance of the sense element due to the presence of the ridge must be sufficiently large so that it is measurable with respect to the parasitic capacitance. For example, dynamic RAMs store data in small capacitors that typically have a relatively large parasitic capacitance. In comparison, the change in capacitance due to the presence of a ridge would be insignificant relative to the parasitic capacitance and would be virtually unmeasurable. Thus, since the parasitic capacitance of the capacitors in a RAM are substantially larger than the capacitance to be measured, dynamic RAMs would be unsuitable as fingerprint sensors.

The fingerprint sensor according to the present invention may be fabricated from any appropriate materials known in the art. In some applications it is advantageous to employ solid state sensors that can contain in a single unit the sense elements and associated circuitry to read out the value of each sense element such as, for example, amplifiers, noise reduction circuitry, and analog-to-digital converters. Some examples of suitable integrated circuit devices include devices fabricated by conventional CMOS processing techniques. Such solid state devices are typically covered by a layer of silicon dioxide several microns thick. This layer serves as the insulating layer that forms the sensing surface 140 located between the sense elements and the finger under investigation. Some embodiments of the invention provide a more resilient sensing surface, which is better capable of withstanding abrasion due to repeated contacts with finger surface 160. One embodiment covers or replaces silicon dioxide with a stronger insulating material such as diamond.

In one embodiment of the present invention, the sensor is fabricated by a conventional CMOS process and the sense elements are spaced apart from one another by approximately 50 microns to achieve a resolution of 300–500 dpi. In this embodiment, the parasitic capacitance of the sense elements without finger surface 160 in close proximity to sensing surface is approximately 180 fF. When the sensing surface 140 receives finger surface 160, the capacitance of sense elements 120 increases to approximately 350 fF under typical environmental conditions.

Figure 5:
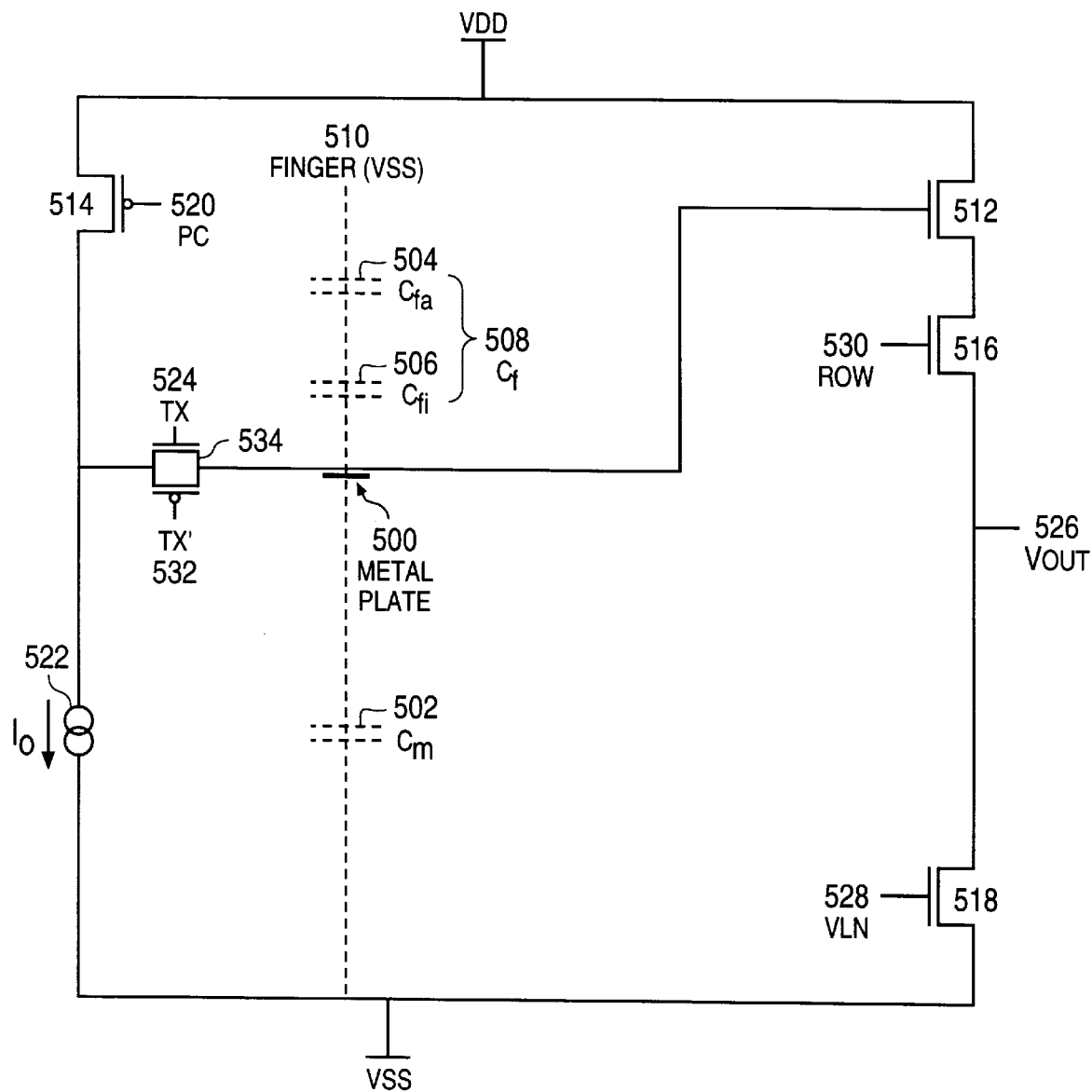
FIG. 5 is a more-detailed circuit diagram illustrating the circuitry associated with a capacitive sense element in accordance with an aspect of the present invention.

FIG. 5 is a detailed circuit diagram of the circuitry associated with a single capacitive sense element in accordance with an aspect of the present invention. Parasitic capacitance $C_m$ 502 and the capacitance between finger 510 and the metal plate $C_f$ 508 are shown in dotted lines. Note that the capacitance between the metal plate 500 and finger 510 is composed of a capacitance between the metal plate and the insulator surface $C_{fi}$ 506 and a capacitance between the insulator surface and the finger surface $C_{fa}$ 504. Metal plate 500 is formed using the highest level of metal to minimize $C_m$ and increase $C_f$. Metal plate 500 connects to the gate of transistor 512, the source of which connects to VDD, and the drain of which connects to the source of transistor 516. The gate of transistor 516 is enabled by ROW signal 530, and the drain of transistor 516 connects to the output of the sense element, VOUT 526. The capacitances of a row of metal plates are measured in parallel by addressing a row of sensor elements through the row selection switches. The control signals are also enabled simultaneously for all the sensor elements in a row. VOUT 526 additionally connects to the source of transistor 518. The gate of transistor 518 is enabled by signal VLN 528, and the drain of transistor 518 connects to VSS. These components function as a source-follower and selection transistor for readout purposes.

On the input side, a CMOS switch 534 is enabled by signal TX 524 and TX' 532, connecting metal plate 500 to both charging circuitry and current source 522. CMOS switch 534 connects through p-channel transistor 514 to VDD. Transistor 514 is enabled by precharge signal PC 520, which connects to the gate of p-channel transistor 514. CMOS switch 534 additionally connects through current source 522 to VSS.

During measurement of the capacitance of metal plate 500, metal plate 500 is connected to the charge input node by turning on the CMOS switch 534. A CMOS switch is used to ensure charging and discharging the metal plate to the rail voltages. Next, metal plate 500 is precharged to VDD by enabling the precharge transistor 514. When transistor 514 is turned off, current $I_O$ from current source 522 discharges the capacitor and the voltage on metal plate 500 decreases at a steady rate. The value of current $I_O$ is selected such that the voltage on metal plate 500 can be sampled after a given time interval to measure the change in voltage.

Figure 6:
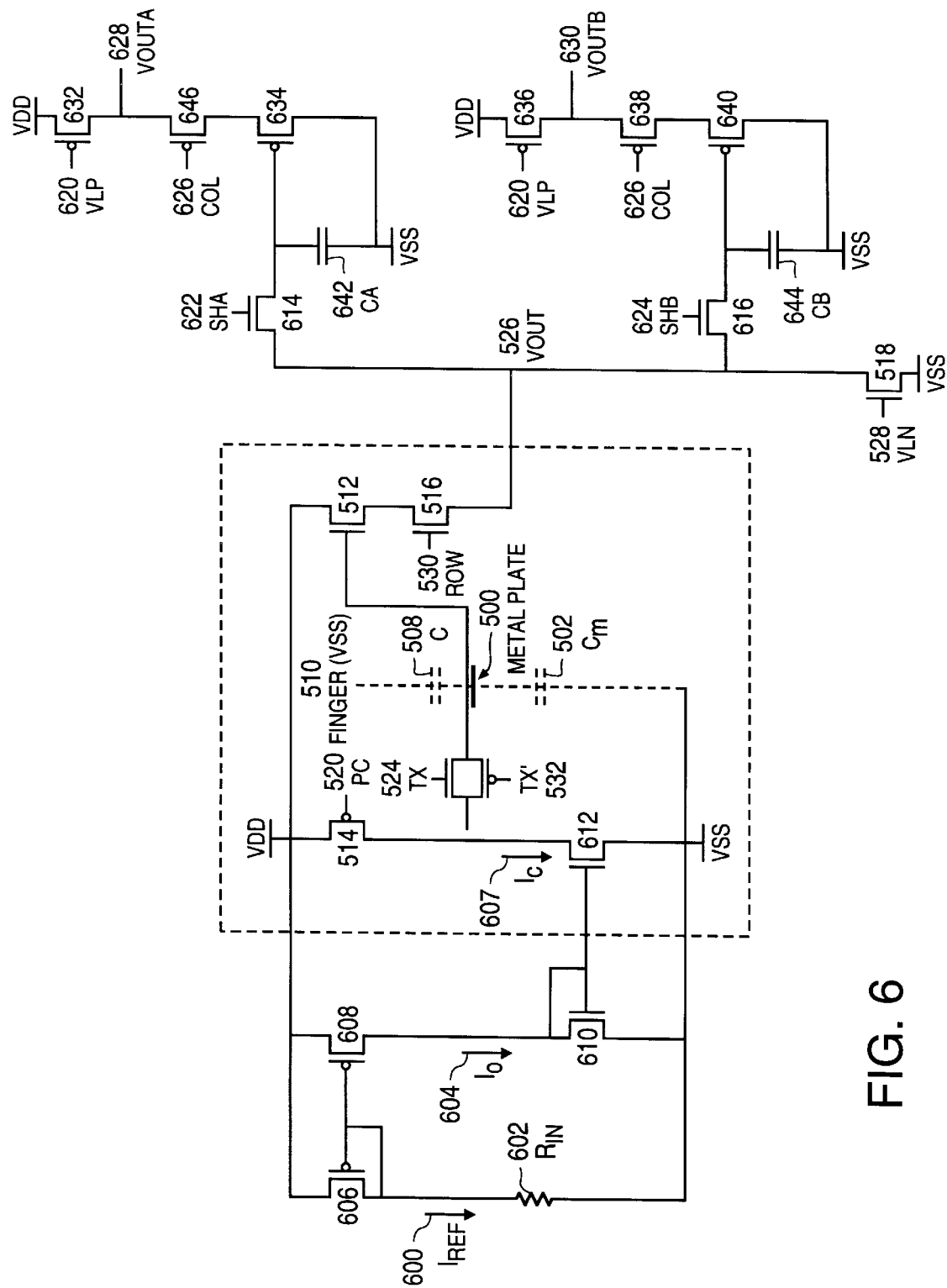
FIG. 6 is a detailed circuit diagram illustrating how the current source and voltage measurement circuits are connected with sense elements in accordance with an aspect of the present invention.

FIG. 6 is a schematic diagram of a single sensor element attached to a readout circuit and a current source. The circuitry in FIG. 6 can be divided into three components. Within the dash lines is the circuitry associated with a single sense element. To the left of the dashed lines is the circuitry associated with the current source. To the right of the dashed lines, is the readout circuitry, including two sample and hold circuits. The readout circuitry is common to a column of sense elements and contains two sampling circuits. Each sampling circuit consists a sample and hold switch and a capacitor and a second source-follower. The first sample is stored immediately after the capacitor has been preset. The second sample is stored a fixed amount of time later, but before the capacitor just discharges completely. The sample values are scanned out differentially through the second set of source-followers by enabling the column selection switches. In another embodiment, a single voltage is sampled by a single sampling circuit after a fixed amount of charge is drained off metal plate 500. (A first sample at time zero is not gathered because the voltage at time zero is assumed to be VDD.)

The output from the sense element VOUT 526 connects through transistor 614 into a first sampling circuit. The gate of transistor 614 is connected to control signal SHA 622. After passing through transistor 614 the output is coupled to capacitor CA 642, the other end of which is coupled to VSS. VOUT 526 also feeds into the gate of p-channel transistor 634, the source of which connects to the drain of p-channel transistor 646, and the drain of which connects to VSS. The gate of p-channel transistor 646 is activated by COL signal 626. The source of p-channel transistor 646, connects to the output VOUTA 628. VOUTA 628 additionally connects through p-channel transistor 632 to VDD. The gate of p-channel transistor 632 is activated by VLP signal 620.

VOUT signal 526 also connects through pass transistor 616 into the second sampling circuit. Pass transistor 616 is activated by signal SHB 624. After passing through pass transistor 616, VOUT 526 is coupled to capacitor CB 644, the other end of which is coupled to VSS. VOUT 526 additionally feeds into the gate of p-channel transistor 640. The drain of p-channel transistor 640 connects to VSS and the source connects to the drain of p-channel 638. The gate of p-channel 638 is activated by COL signal 626, and the source of p-channel transistor 638 connects to VOUTB 630. VOUTB 630 additionally connects through p-channel transistor 636 to VDD. P-channel transistor 636 is activated by signal VLP 620, which feeds into the gate of p-channel transistor 636. VOUT signal 526 additionally connects through transistor 518 to VSS. The gate of transistor 518 is activated by signal VLN 528.

The circuitry for the sense element inside the dotted lines is described previously in the discussion of FIG. 5.

The current source, on the left hand side of the sense element circuitry, includes three stages. The first stage is common to the entire chip. Its current, $I_{ref}$ 600, is set through off-chip resistor $R_{in}$ 602. One end of resistor $R_{in}$ 602 connects to VSS and the other end connects to the drain of p-channel transistor 606 and the gates of p-channel transistors 606 and 608. The second stage is replicated in each column and mirrors the reference current from the first stage, $I_{ref}$ 600. This second stage includes p-channel transistor 608, the source of which connects to VDD, and the drain of which connects to the source of transistor 610 and the gates of transistors 610 and 612. The drain of transistor 610 connects to VSS. Current $I_O$ 604 flows through both p-channel transistor 608 and transistor 610. The third stage is replicated in each sense element and mirrors the current from the second stage, $I_O$ 604. Current $I_c$ 607 flows through the third stage, through p-channel transistors 514 and 612. A 2-to-1 ratio is used between stages to provide a low current without requiring a very large resistor.

The array of sensor elements and the column-parallel readout circuits are addressed and controlled through 9-bit row and column decoders and row-parallel clock generator circuits.

Figure 7:
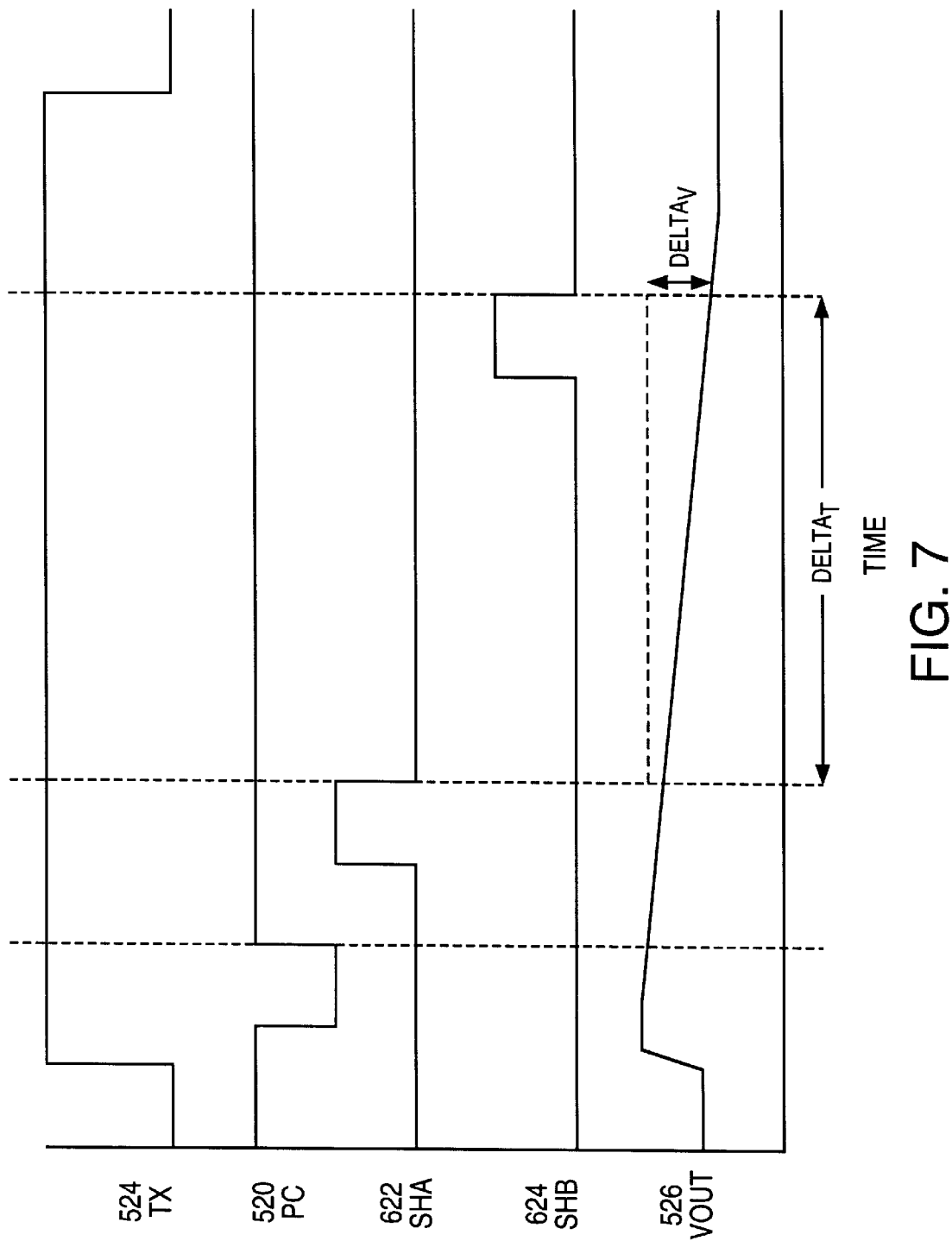
FIG. 7 is a graph of voltages on various terminals in FIG. 6 during operation of the circuitry in FIG. 6 in accordance with an aspect of the present invention.

FIG. 7 is a timing diagram illustrating the operation of the circuit in FIG. 6 according to an aspect of the present invention. When signal TX 524 is asserted, CMOS switch 534 is turned on, allowing a source of charging current and the current source to be coupled to metal plate 500. First, signal PC 520 is asserted to a low value for a short period of time. This causes VOUT 526 to go from a low value to a high value as the capacitor formed between metal plate 500 and finger surface 160 is charged to VDD. After a first time interval, signal SHA 622 is asserted to a high value for a short period of time to take a sample of the voltage of VOUT 526. After a second time interval, signal SHB 624 is asserted to a high value to take a second sample of the voltage of VOUT 526. The difference between these sample voltages is then used to indicate the capacitance between metal plate 500 and finger surface 160.

Figure 8:
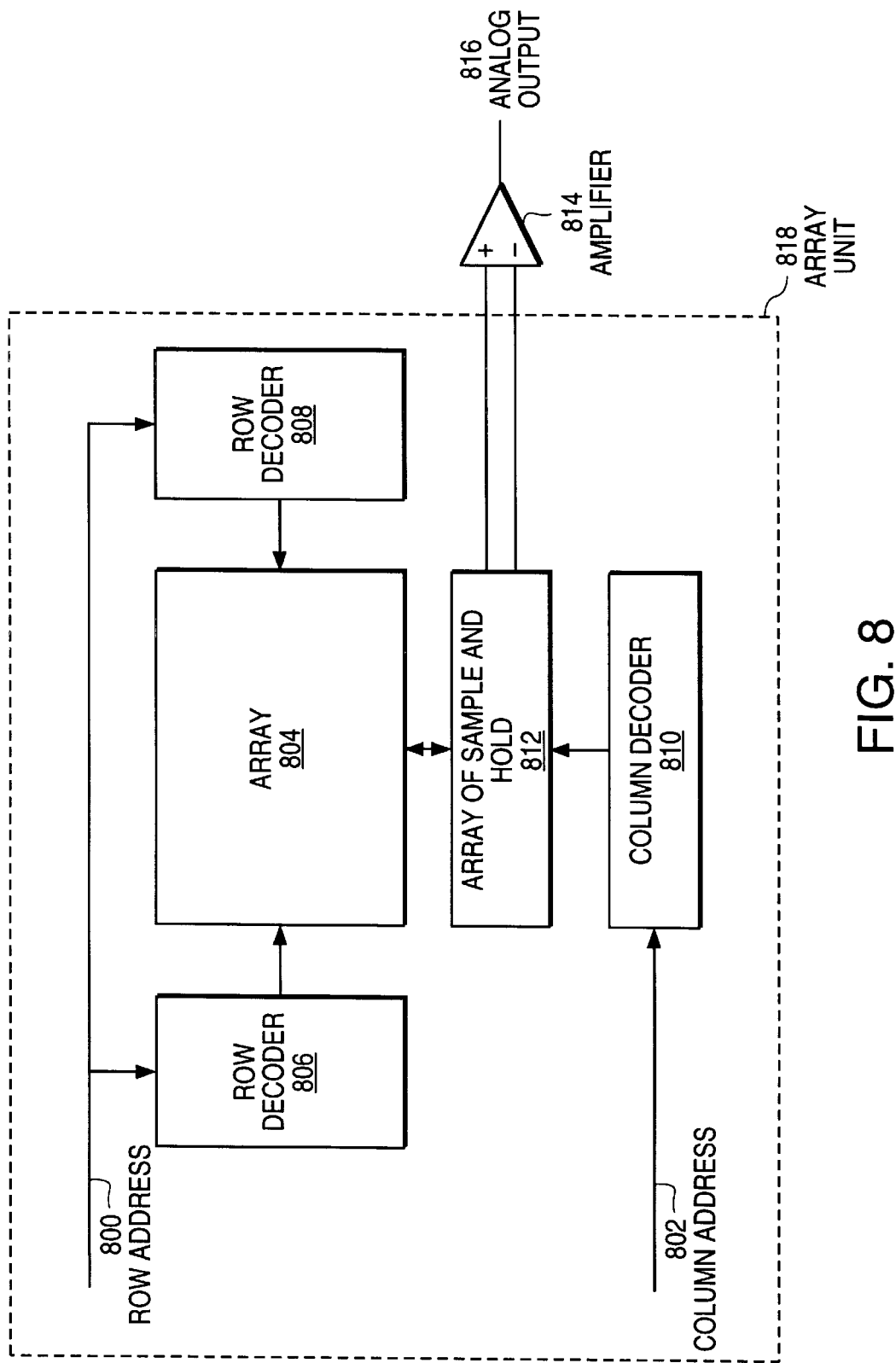
FIG. 8 is a block diagram illustrating the support circuitry associated with an array of capacitive sense elements in accordance with an aspect of the present invention.

FIG. 8 is a block diagram illustrating the support circuitry associated with an array of sense elements in accordance with an aspect of the present invention. Row address 800 and column address 802 feed in from the left-hand-side of FIG. 8. Row address 800 feeds into both row decoder 806 and row decoder 808. The outputs of row decoder 806 and row decoder 808 feed into opposite sides of the array of sense elements 804. In this embodiment, each row line of array 804 has two drivers; one from the left-hand-side from row decoder 806, and one from the right hand side from row decoder 808. Providing two sets of drivers for each row line improves the charging performance of array 804. In another embodiment, a single row decoder 806 is used for each row line.

Column address 802 feeds into column decoder 810. The output of column decoder 802 feeds into array of sample and hold circuits 812, which takes inputs in column-parallel form from the bottom of array 804.

Row decoders 806 and 808 select a row of sense elements from array 804. The outputs from the selected row feed into array of sample and hold circuits 812. Column decoder 810 selects a sense element from the selected row. The output from the selected sense element feeds into array of sample and hold circuits 812. The output from array of sample and hold circuits 812 feeds through amplifier 814 to produce analog output 816. All of the above-described circuitry fits within array unit 818.

Figure 9:
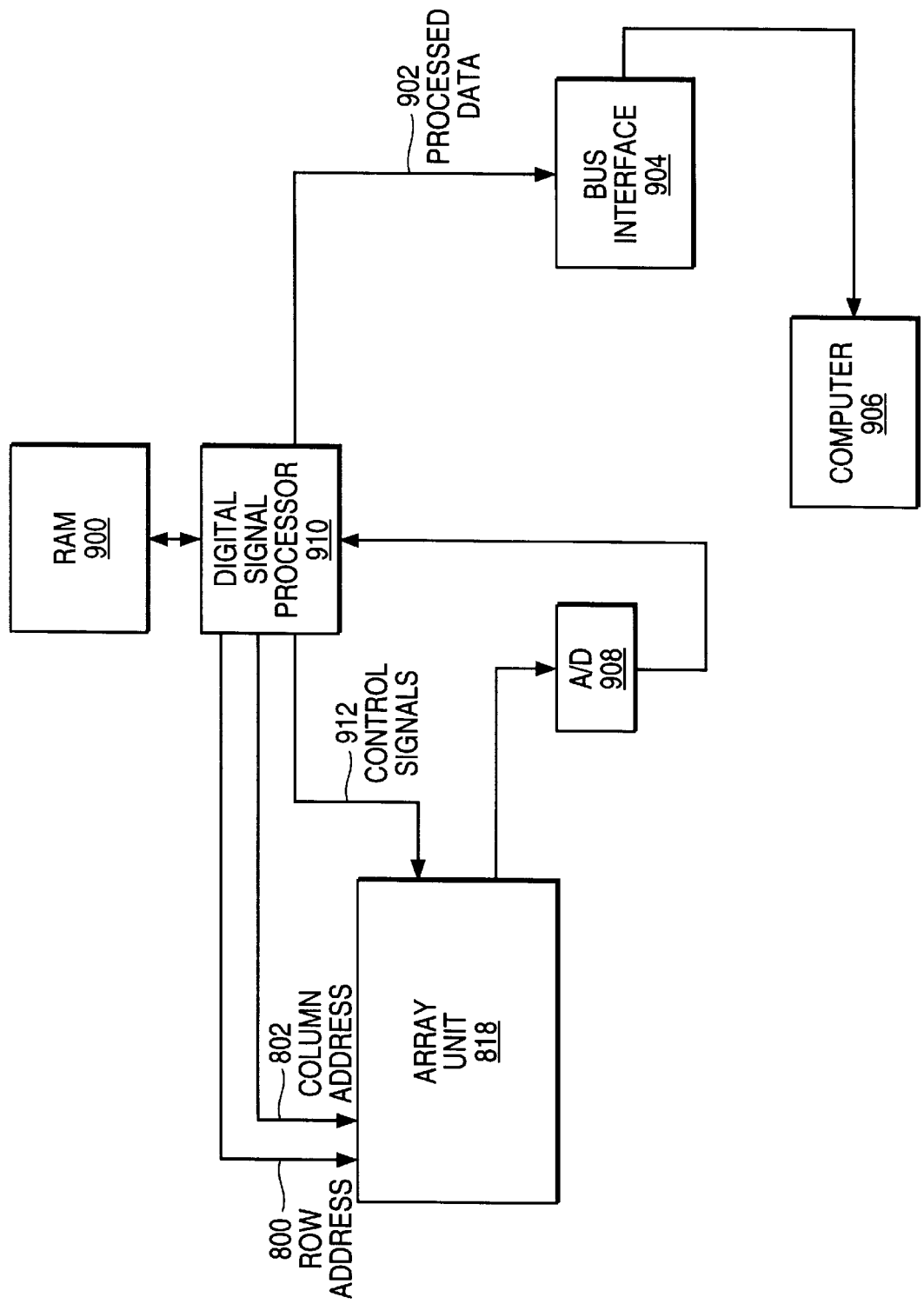
FIG. 9 is a block diagram illustrating how an array of sense elements connects with digital signal processor 910 and computer 906 in accordance with an aspect of the present invention.

FIG. 9 is a block diagram illustrating how array unit 818 fits into a computing system, including digital signal processor 910 and computer 906, in accordance with an aspect of the present invention. Digital signal processor 910 connects to row address lines 800 and column address lines 802 which feed into array unit 818. Digital signal processor also outputs control signal 912, which comprises a plurality of control signals also feeding into array unit 818. The output from array unit 818, which is in analog form, feeds into A/D converter 908. This converts the analog signal into a digital signal which feeds into digital signal processor 910. Digital signal processor 910 processes the output from A/D converter 908 and feeds the processed output through processed data line 902 to bus interface 904. Finally, bus interface 904 feeds this output into computer 906.

During operation the circuitry in FIG. 9 operates as follows. Digital signal processor 910 feeds a number of signals into array unit 818, including row address 800, column address 802 and control signals 912. These signals cause sense elements in array unit 818 to cycle through charge and discharge cycles to measure capacitance on sense elements within array unit 818. The output of array unit 818 feeds into A/D converter 908, which converts the output into digital form which feeds into digital signal processor 910. Digital signal processor 910 takes this output and processes it to create processed data 902, which feeds through bus interface 904 into computer 906. Digital signal processor uses RAM 900 to store instructions and code involved in this process.

Image quality is evaluated using well-known techniques in digital photography to determine whether the image of a fingerprint acquired by array unit 818 is of sufficient quality for identification purposes. If not, digital signal processor 910 feeds control signals 912 into array unit 818 to adjust the gain on sense elements within array unit 818. This gain adjustment may be accomplished by adjusting the timing between samples of the voltage on the sense elements, or alternatively, by adjusting the current flowing through the current source within each sense element by adjusting an external potentiometer such as $R_{in}$ 602 in FIG. 6.

After a number of iterations of gain adjustment have been accomplished, and a satisfactory image has been gathered from array unit 818, processed data 902 is fed through bus interface 904 to computer 906 where the data can be used for a variety of identification purposes.

Figure 10:
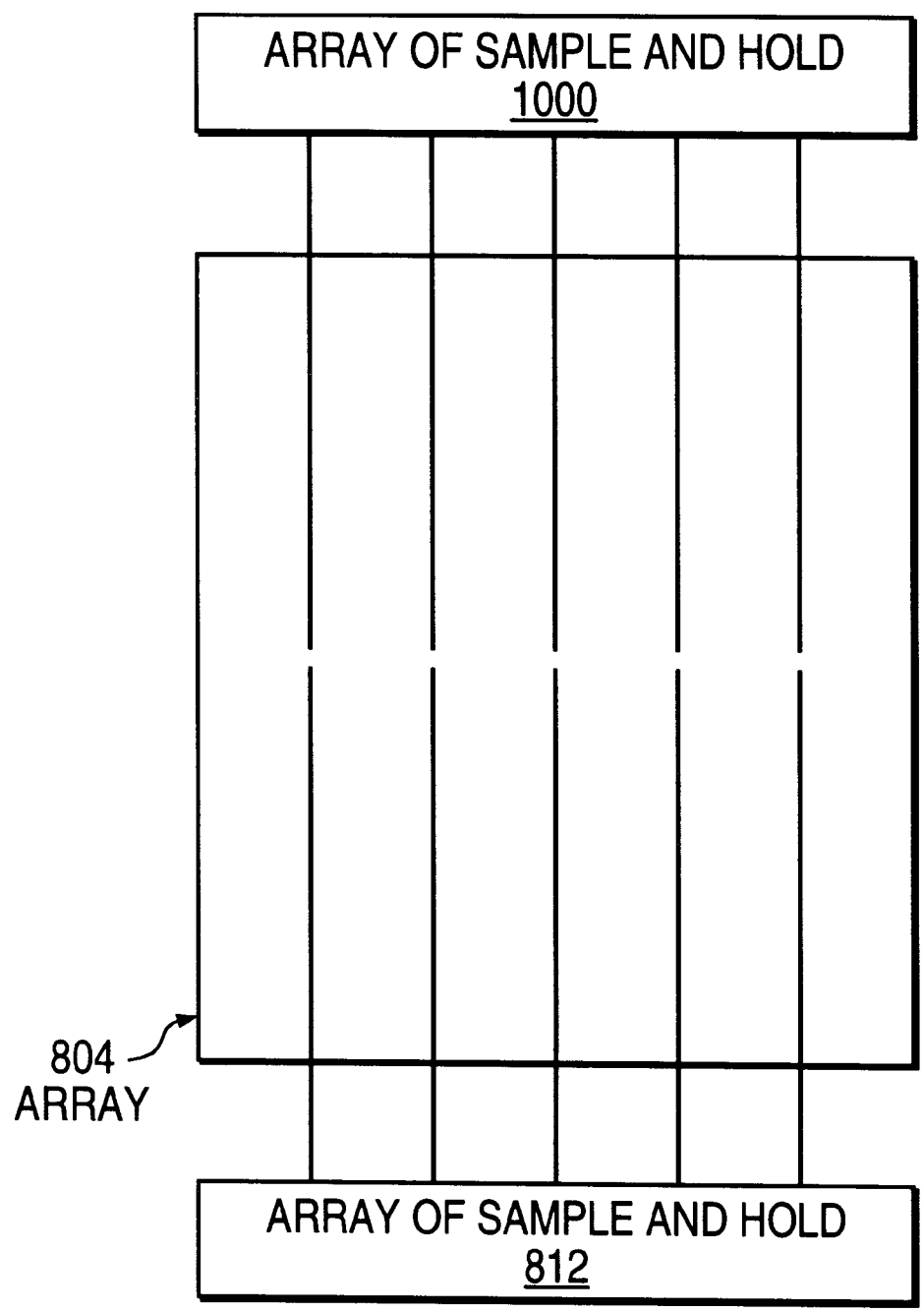
FIG. 10 illustrates an alternative embodiment for the support circuitry for the array of sense elements including split column lines in accordance with an aspect of the present invention.

FIG. 10 illustrates an alternative embodiment of the support circuitry for the array of sense elements in accordance with an aspect of the present invention. In this embodiment, the vertical output lines are divided at the midpoint of the array, and two sets of sample and hold circuits, 812 and 1000, are provided, so that output signals from sense elements within array 804 traverse at most hall of the vertical height of the array. This reduces problems of load and noise caused by long column lines.

The capacitive fingerprint sensor according to the present invention may be incorporated into a variety of different devices to provide an indication that a person having possession of the device is authorized to use the device. For example, authentication cards such as credit cards, debt cards, smart cards, etc., often require the user to provide a personal identification number (PIN) prior to use. If the card itself is misappropriated, the PIN would not be known to unauthorized users. However, the PIN would be given to, and known by, a merchant when the card holder initiates a transaction. It is also possible for the PIN to be misappropriated by a person who overhears a transaction or observes the cardholder as the PIN is written or entered via a keyboard or by a vendor to whom the customer gives the PIN to authorize themselves.

These problems can be overcome by incorporating the fingerprint sensor of the present invention into an authorization card. The card includes circuitry for comparing the acquired fingerprint against those of an authorized user or users, which are stored in a memory incorporated into the card. When the card is presented for use, the user verifies that he or she is an authorized user by placing a finger on the sensor located on the card.

The fingerprint sensor also may be incorporated into other validation devices that store fingerprints of authorized users. For example, the fingerprint sensor may be incorporated into an automated teller machine (ATM). The user would be required to demonstrate that he or she is an authorized user prior to performing a transaction. The fingerprint sensor also may be incorporated into a validation or authorization device in possession of a merchant at a point of sale, for example.

The foregoing description of embodiments of the invention have been provided for purposes of illustration and description only. They are not intended to be exhaustive or to limit the invention to the forms disclosed. Obviously, many modifications and variations will be apparent to practitioners skilled in the art.

What is claimed is:

1. A method for detecting a fingerprint from a finger surface, the method using a plurality of sense elements, the method comprising the steps of:

placing the finger surface over the plurality of sense elements;

measuring electrical signals from the plurality of sense elements, the electrical signals indicative of an interaction between the plurality of sense elements and the finger surface;

forming the electrical signals into a representation of the fingerprint from the finger surface;

evaluating the quality of the representation of the fingerprint; and if the representation is of poor quality due to a quality of the finger surface, adjusting a gain of the plurality of sense elements, and measuring the electrical signals again to form another representation of the fingerprint, wherein adjusting the gain includes adjusting a current feeding into each of the plurality of sense elements or adjusting a time interval before a measurement is made.

2. The method of claim 1, wherein the step of measuring electrical signals from the plurality of sense elements measures a capacitance between the plurality of sense elements and the finger surface.

3. The method of claim 1, wherein adjusting the current feeding into the plurality of sense elements includes adjusting a potentiometer.

4. An apparatus for detecting a fingerprint on a finger surface, comprising:

an array of sense elements, sense elements in the array including, an electrode plate which forms a capacitor with the finger surface, and an amplifier, which amplifies a voltage on the electrode plate;

an insulating and receiving surface disposed over the array of sense elements;

driving circuitry coupled to the sense elements in the array of sense elements for driving a voltage onto the electrode plates in the sense elements;

sensing circuitry coupled to the sense elements for sensing a voltage on the electrode plates in the sense elements, the sensing circuitry producing a first representation of the fingerprint;

means for evaluating the quality of the first representation; and gain adjusting circuitry coupled to the sense elements for adjusting the gain of the sense elements if the first representation is of poor quality due to a quality of the finger surface, the gain adjusting circuitry including a circuit to adjust a current flowing into each of the sense elements or a circuit to adjust timing of a sampling interval for the sense elements, wherein if the first representation is of poor quality, the sensing circuitry producing a second representation of the fingerprint once the gain adjusting circuitry has adjusted the gain of the sense elements.

5. The apparatus of claim 4, wherein sense elements in the array of sense elements include a current source, which drains current from the electrode plate at a pre-determined rate.

6. The apparatus of claim 5, wherein sense elements in the array of sense elements include:

a drive input including a drive switch to selectively switch driving current onto the electrode plate, and a sense output including a sense switch to selectively switch voltage from the electrode plate to the sense output.

7. The apparatus of claim 4, including at least one voltage measurement circuit for measuring a voltage on an electrode plate in a sense element in the array of sense elements.

8. The apparatus of claim 4, wherein the sensing circuitry includes a plurality of lines extending through the array of sense elements, the plurality of lines carrying voltage signals from sense elements in the array of sense elements to voltage measuring circuitry on a periphery of the array, lines in the plurality of lines traversing at most half of the array before arriving at the periphery of the array.

9. The apparatus of claim 4, wherein the driving circuitry includes:

a plurality of lines extending through the array of sense elements, the plurality of lines delivering driving current to the sense elements;

a plurality of drivers on the periphery of the array coupled to the plurality of lines, for supplying the drive current delivered to the sense elements, such that a pair of drivers are attached to opposite ends of lines in the plurality of lines.

10. The apparatus of claim 4, including an addressing mechanism for selectively accessing at least one sense element from the array of sense elements.

11. The apparatus of claim 4, wherein the array of sense elements is located on a semiconductor substrate.

12. The apparatus of claim 4, wherein the array of sense elements is located in a module, the module including:

at least one analog to digital converter coupled to the sensing circuitry;

a digital signal processor coupled to the at least one analog to digital converter for performing computations on a representation of the fingerprint gathered from the array; and an interface circuit for communicating with devices outside of the module.

13. The apparatus of claim 12, wherein the module is a semiconductor chip.

14. The apparatus of claim 12, wherein the module is a multi-chip module.

* * * * *